United States Patent [19]
Chen et al.

[11] Patent Number: 6,094,131
[45] Date of Patent: Jul. 25, 2000

[54] KEYLESS LOCK DEVICE FOR A CAR

[76] Inventors: Shin-Chung Chen; Sen-Jung Chen, both of No. 11-11, 3 Lin, Neitso Tsun, Luchu Hsiang, Taoyuan Hsien, Taiwan

[21] Appl. No.: 09/247,360

[22] Filed: Feb. 10, 1999

[30] Foreign Application Priority Data

Nov. 30, 1998 [TW] Taiwan ................................. 87219906

[51] Int. Cl.[7] ................................................. B60R 25/10
[52] U.S. Cl. ................ 340/426; 340/425.5; 340/825.31; 340/825.32; 340/539
[58] Field of Search ................................ 340/425.5, 426, 340/428, 825.31, 825.32, 539; 307/10.2

[56] References Cited

U.S. PATENT DOCUMENTS 4,983,947  1/1991  Mullen et al. ........................... 340/426

*Primary Examiner*—Daryl C. Pope
*Attorney, Agent, or Firm*—Thomas, Kayden, Horstemeyer & Risley, L.L.P.

[57] ABSTRACT

A keyless lock device is disclosed, which has a master control unit installed in a car and a remote controller carried by a user. The master control unit has a processing unit connected to a centralized locking control unit of the car to lock and unlock the door of the car. A detection switch is installed in the door handle of the driver-side door of the car. The processing unit is connected to the detection switch to detect when the door handle is pulled. The master control unit transmits an acknowledgement signal when the door handle is pulled. The remote controller receives the acknowledgement signal and generates a re-acknowledgement signal encoded with a specific encrypted code for transmission. The re-acknowledge signal is then received by the master control unit to be recognized.

5 Claims, 6 Drawing Sheets

KEYLESS LOCK DEVICE FOR A CAR

BACKGROUND OF THE INVENTION

1. Field of the Invention

The present invention relates to a lock device for a car, more particularly, to a keyless lock device which automatically detects the remote control, unlocks the doors and allows a user to open the door of a car without pressing a button or otherwise manually activating the remote control.

2. Description of Related Art

Currently, cars are usually provided with a master control unit to lock or unlock the doors and trunk by a remote control. The master control unit is activated by the remote control and drives a centralized locking control unit such that the doors and trunk can be locked or unlocked remotely by simply pressing a button. Consequently, the doors and trunk of a car can be opened or closed conveniently. However, it might be more convenient to open the door if the step of pressing a button were not required.

SUMMARY OF THE INVENTION

The objective of the present invention is to provide a keyless lock device to make opening a car door easier.

To achieve the objective, the keyless lock device of the present invention comprises a master control unit installed in a car and a remote control carried by a user. The master control unit has a processing unit, a transmitting means connected to the processing unit and a receiving means connected to the processing unit. The processing unit is connected to a centralized locking control unit of the car to lock and unlock the door of the car. A detection switch is installed in the door handle of the driver-side door of the car. The processing unit is connected to the detection switch to detect when the door handle is pulled. The transmitting means transmits an acknowledgement signal when the door handle is pulled. The remote control has a receiving and amplifying circuit for receiving and amplifying the acknowledgement signal. An encoder is provided for encoding the acknowledgement signal to generate a re-acknowledgement signal with a specific encrypted code. The re-acknowledge signal is then amplified by a high frequency amplifying circuit to be transmitted and received by the master control unit to be recognized.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
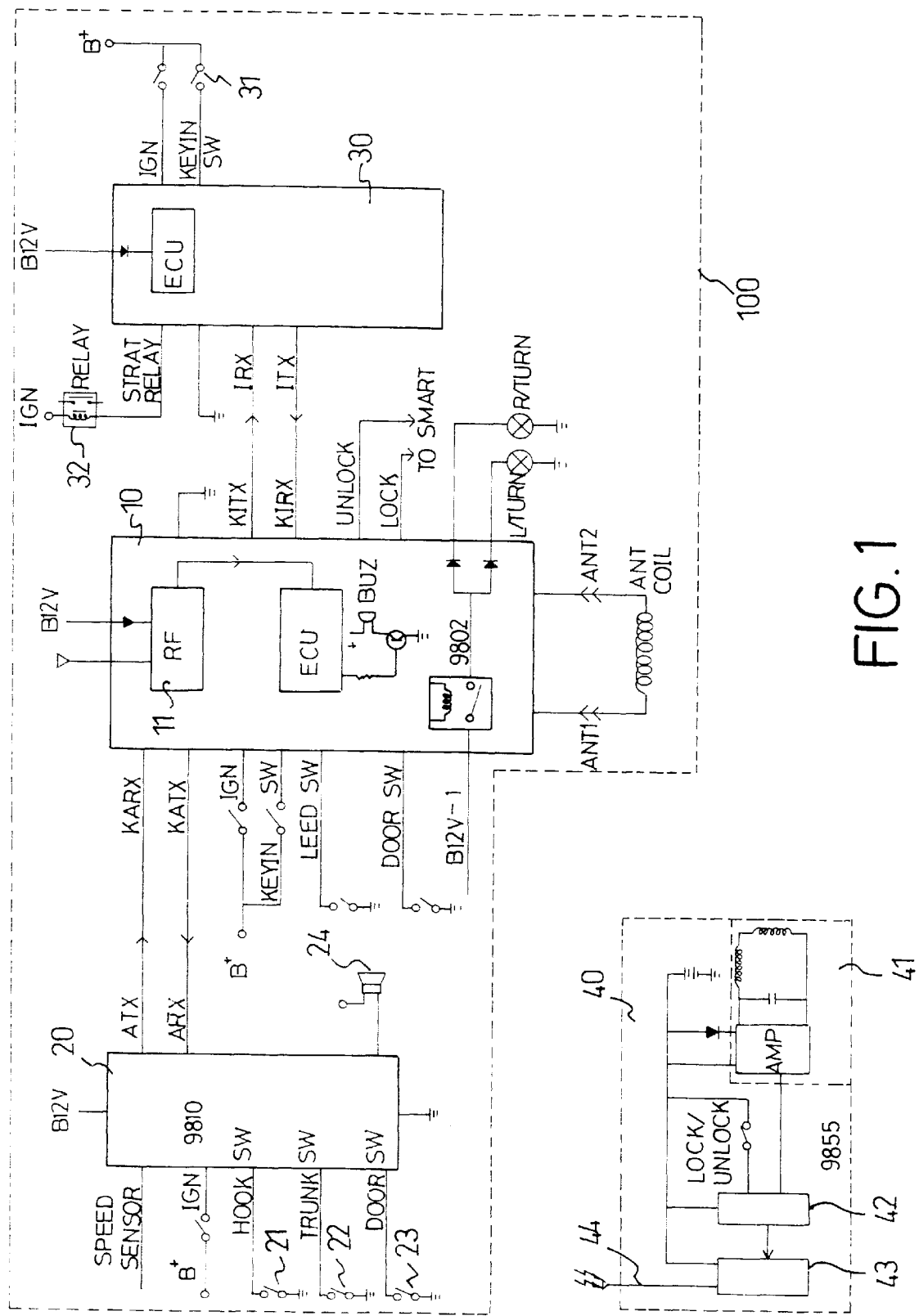
FIG. 1 is a circuit block diagram of the keyless lock device in accordance with the present invention.

FIG. 1 schematically illustrates the structure of the keyless lock device in accordance with the present invention, which comprises a master control unit (100) and a remote controller (40). The master control unit (100) is installed in a car and is connected to the centralized locking control unit device and the engine of the car. The remote control (40) is portable and carried everywhere by a user.

Figure 2:
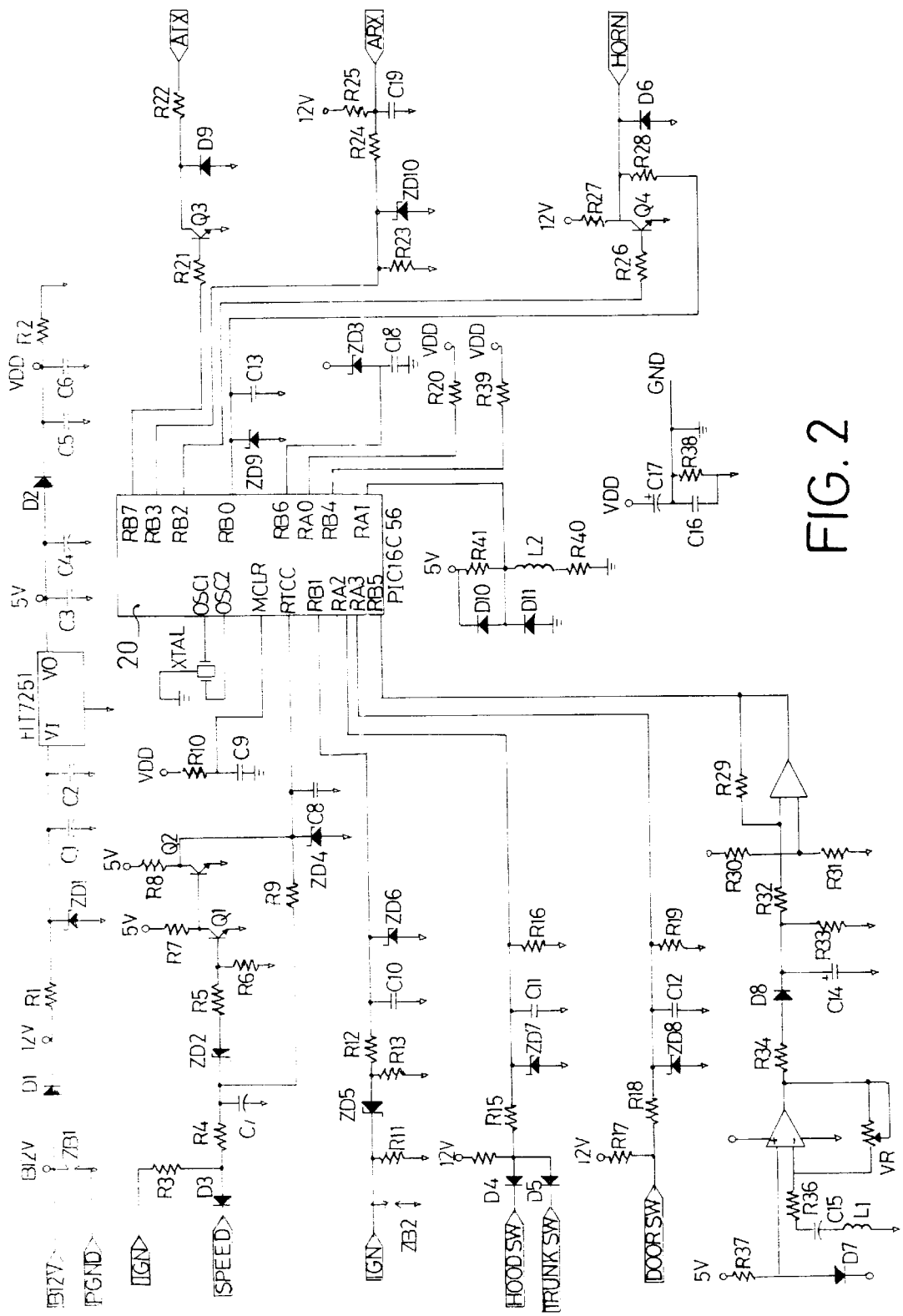
FIG. 2 shows an alarm unit and its associated circuitry of the keyless lock device.

The master control unit (100) comprises a processing unit (10), an alarm unit (20) and a engine start unit (30). The alarm unit (20) and the associated circuitry are shown in FIG. 2, wherein the alarm unit (20) is preferred to be a PIC16C56 processor IC. The alarm unit (20) has three input pins RA2, RA3 and RA5 connected to three alarm switches (21,22,23) which are installed for the hood, trunk and doors, respectively, and an output pin RB2 connected to a horn (24). Therefore, if the hood, trunk or door is opened by a thief, the corresponding switch (21,22,23) is turned on and the horn (24) is activated as an alarm. In addition, the alarm unit (20) is connected to the processing unit (10) via an output pin RB7 and an input pin RB3.

Figure 3:
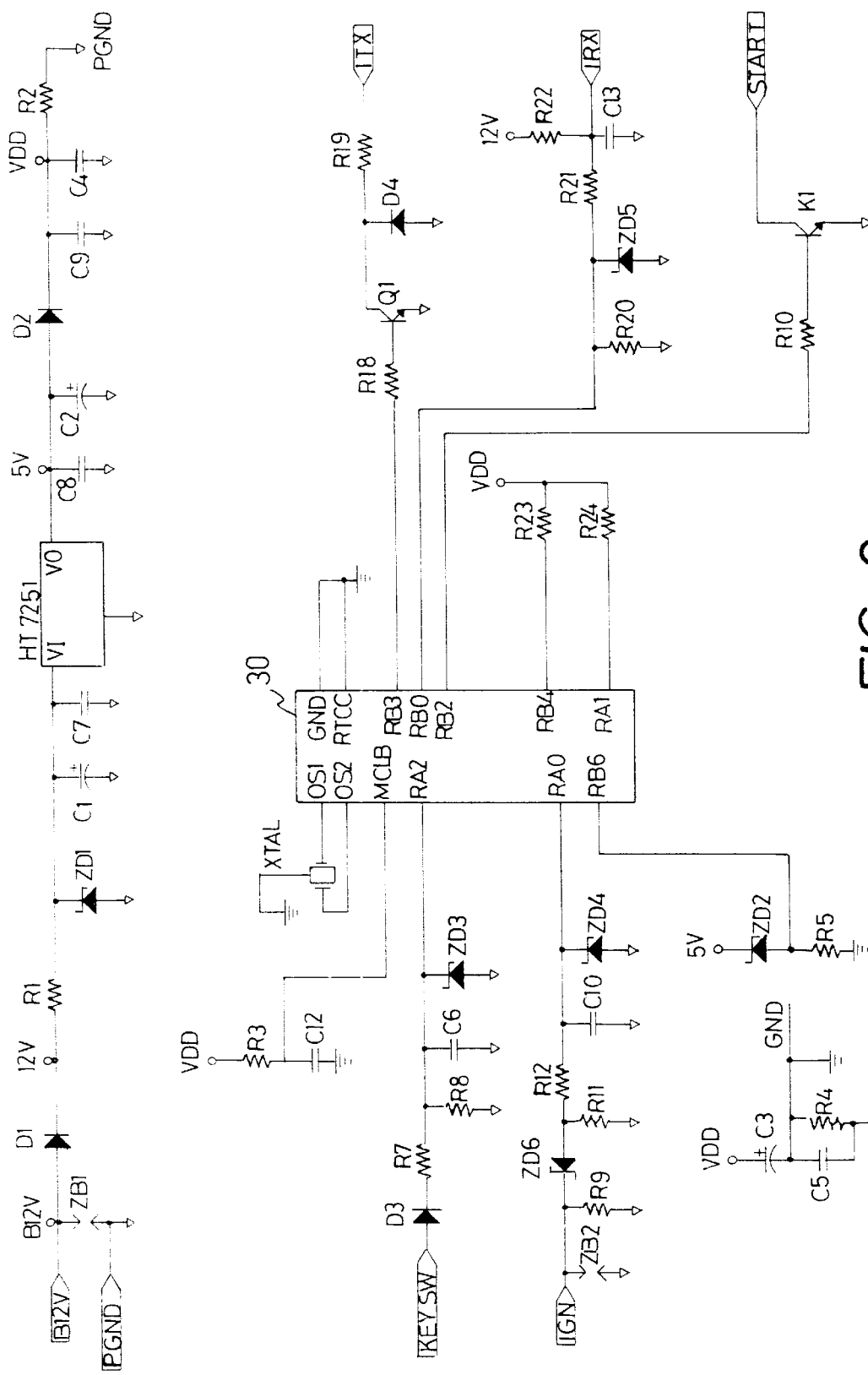
FIG. 3 shows an engine start unit and its associated circuitry of the keyless lock device.

The engine start unit (30) and the associated circuitry are shown in FIG. 3, wherein the engine start unit (30) is preferred to be a PIC16C56 processor IC. The engine start unit (30) has an input pin RA2 connected to a detection switch (31) which is installed in the engine start lock in the dashboard, thereby being able to detect the insertion of a key for starting the engine. An output pin RB2 of the engine start unit (30) is connected to a relay (32) for controlling the engine to be started. In addition, the engine start unit (30) is connected to the processing unit (10) via an output pin RB3 and an input pin RB0.

Figure 4A:
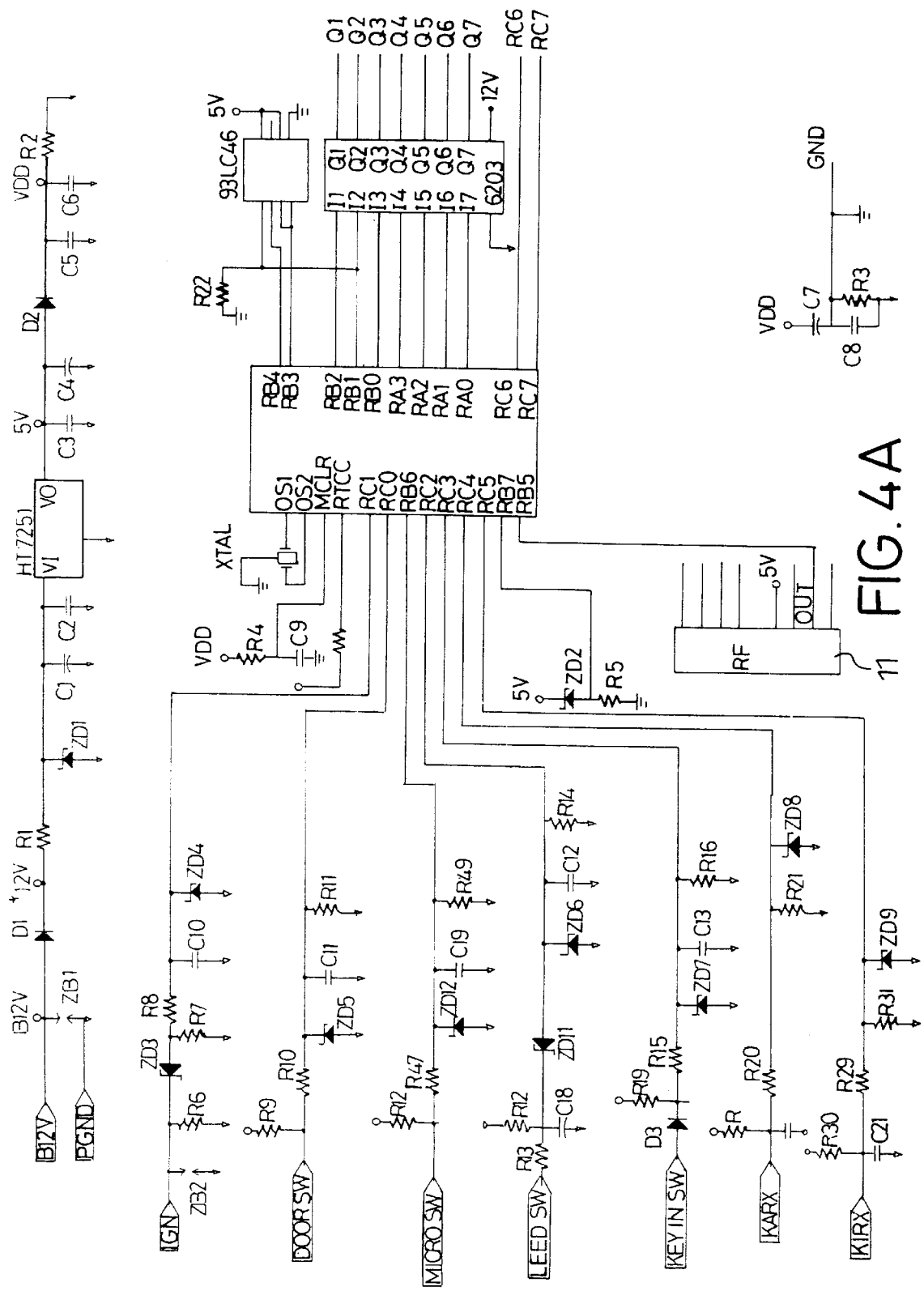
FIG. 4A and FIG. 4B show a processing unit and its associated circuitry of the keyless lock device.
Figure 4B:
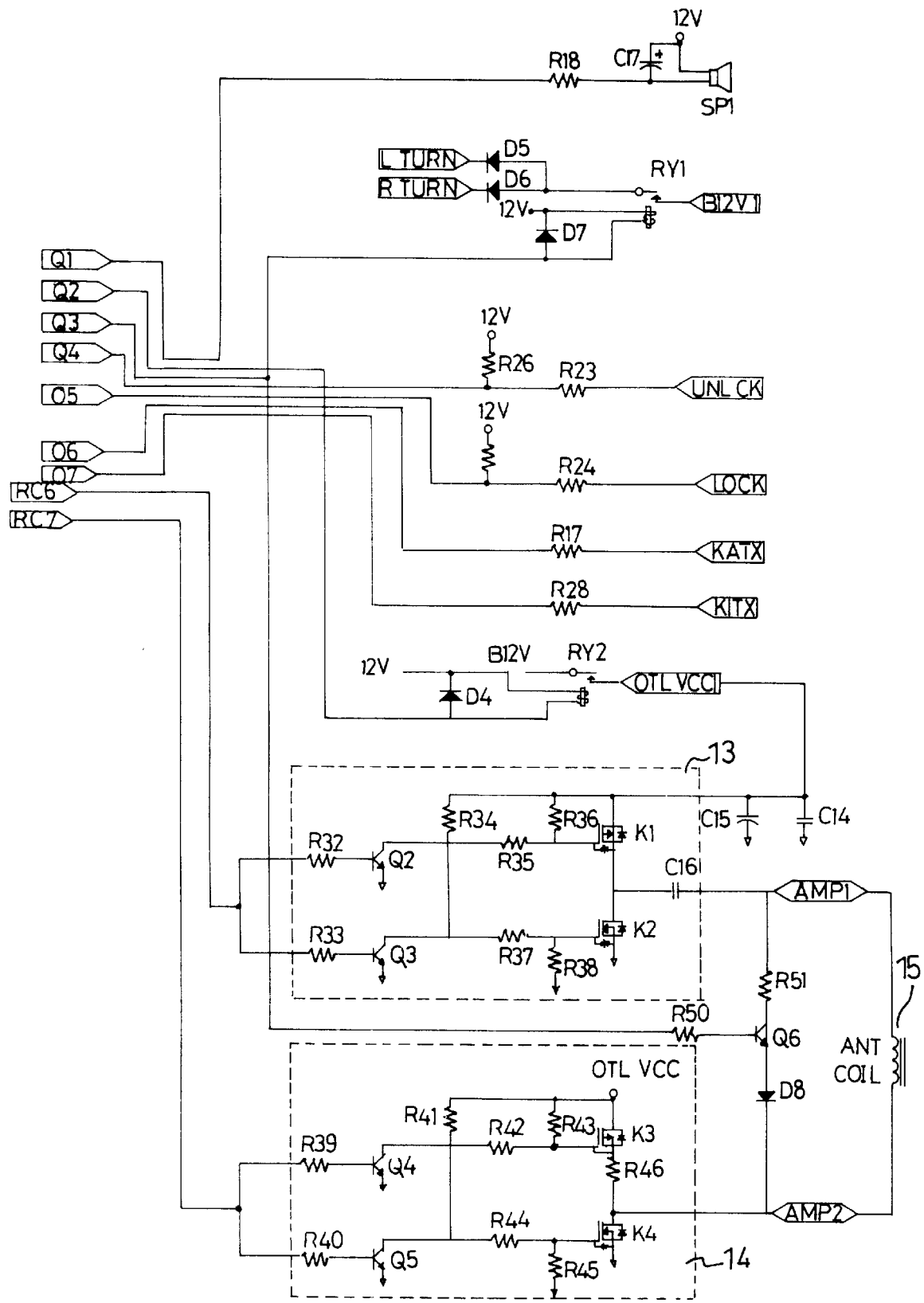

The processing unit (10) and the associated circuitry are shown in FIG. 4A and FIG. 4B, wherein the processing unit (10) is preferred to be a PIC16C56 processor IC. The processing unit (10) has an input pin RB5 connected to a receiver (11) and an input pin RC2 connected to a detection switch (12) which is installed in the door handle of the driver-side door. Therefore, when a user pulls the door handle, the detection switch (12) is triggered and the processing unit (10) is notified of such via the input pin RC2. Furthermore, the processing unit (10) has two output pins RC6 and RC7 connected to two transmitters (13, 14) respectively. The two transmitters (13, 14) are both connected to an antenna (15) for transmitting an acknowledgement signal. The processing unit (10) is also connected to the centralized locking control unit (via LOCK and UNLOCK pins), the alarm unit (20) and the engine start unit (30).

Figure 5:
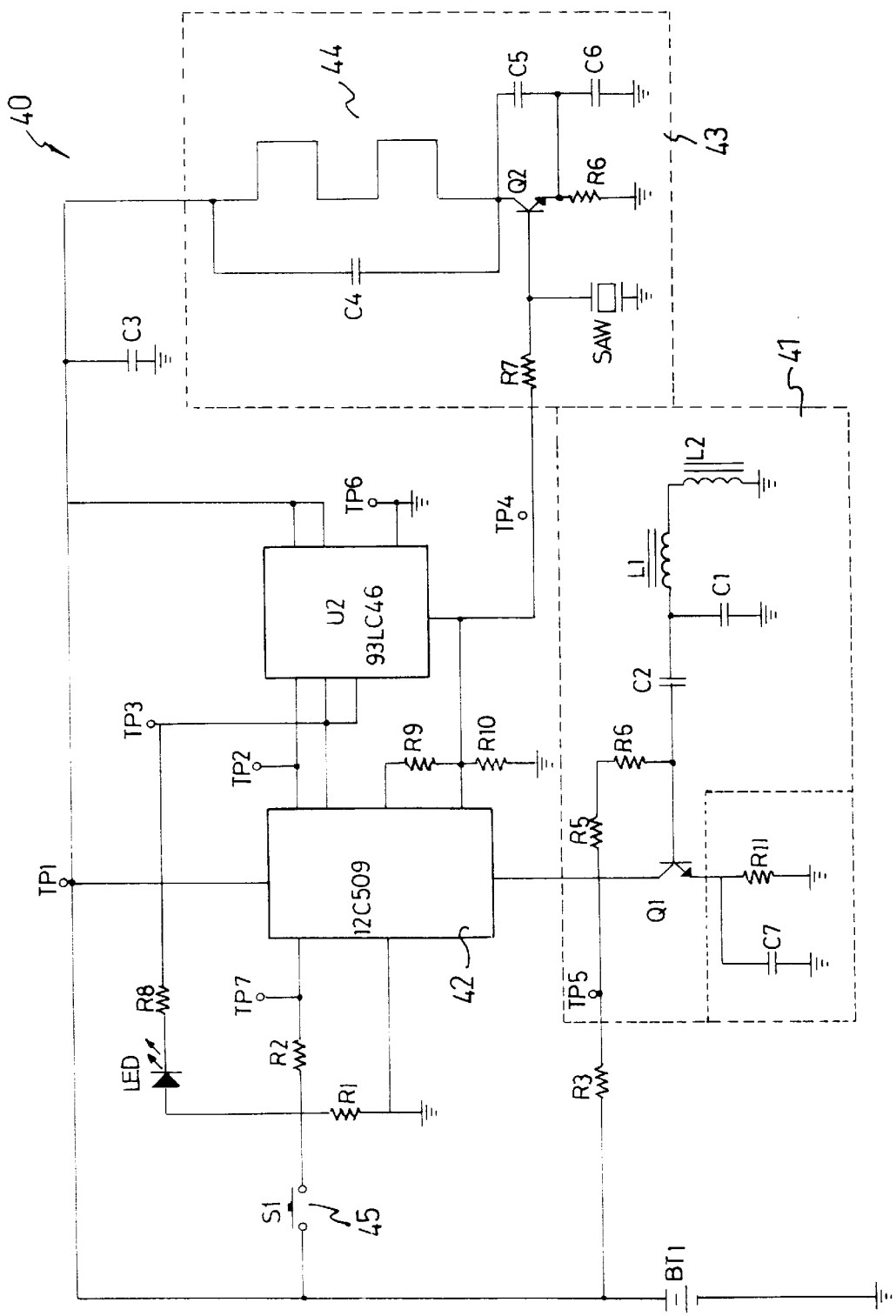
FIG. 5 is a detailed circuit diagram of a remote control for the keyless lock device.

With reference to FIG. 5, the remote control (40) comprises a receiving and amplifying circuit (41), an encoder (42) and a high frequency amplifying circuit (43). The receiving and amplifying circuit (41) is constituted by electronic elements such as coil, capacitor, amplifier, etc., for receiving the acknowledgement signal transmitted from the master control unit (100). The received acknowledgement signal is amplified and sent to the encoder (42) for generating a re-acknowledgement signal encoded with a specific encipher code. The re-acknowledgement signal is then amplified by the high frequency amplifying circuit (43) and transmitted by an antenna (44) thereof. Besides, a push-button switch (45) is provided between the encoder (42) and the battery set. When the push-button switch (45) is pressed, the re-acknowledgement can also be transmitted to the master control unit (100) to unlock the door of the car. Therefore, the use of the remote control (40) also conforms to that of the conventional one.

However, as described above, the objective of the present invention is to simplify the steps in opening the door of a car by eliminating the necessity of pressing the push-button switch (45) of the remote control (40). This is achieved by signal interactions between the master control unit (100) and the remote controller (40) carried by the user. When the user with the remote control (40) approaches his car and pulls the door handle of the driver-side door, the detection switch (12) installed in the door handle is turned on to notify the processing unit (10) of the master control unit (100) about such an operation. The processing unit (10) thus generates an acknowledgement signal to transmit to the remote control (40). After a predetermined period of time, if a corresponding re-acknowledgement signal is not received, the processing unit (10) will transmit the acknowledgement signal again.

The remote control (40) receives the acknowledgement signal via the receiving and amplifying circuit (41). The received acknowledgement signal is amplified and sent to the encoder (42) for generating a re-acknowledgement signal encoded with a specific encipher code. The re-acknowledgement signal is then amplified by the high frequency amplifying circuit (43) and transmitted.

The re-acknowledgement signal is received by the processing unit (10) via the receiver (11) for being recognized. If the re-acknowledgement signal is recognized to be correct, the processing unit (10) will drive the centralized locking control unit to unlock the doors. Therefore, when the user pulls the door handle, the master control unit (100) inside the car will automatically interact with the remote control (40) carried by the user for driving the centralized locking control unit to unlock the door. Accordingly, the opening of the door of a car becomes more convenient.

Although the present invention has been explained in relation to its preferred embodiment, it is to be understood that many other possible modifications and variations can be made without departing from the spirit and scope of the invention as hereinafter claimed.

What is claimed is:

1. A keyless lock device for a car, said car having a centralized locking control unit for locking and unlocking the door thereof and a detection switch installed in a door handle thereof, said keyless lock device comprising:

a master control unit installed in a car, said mater control circuit having a processing unit, a transmitting means connected to said processing unit and a receiving means connected to said processing unit, said processing unit being connected to said centralized locking control unit for locking and unlocking the door, and said detection switch for detecting that said door handle is pulled, said transmitting means transmitting an acknowledgment signal when said detection switch is triggered by pulling said door handle; and a remote control having a receiving and amplifying circuit for receiving and amplifying said acknowledgement signal, an encoder for encoding said acknowledgement signal to generate a re-acknowledgement signal with a specific encrypted code, a high frequency amplifying circuit for amplifying said re-acknowledgement signal and an antenna for transmitting said amplified re-acknowledge signal, wherein said transmitted re-acknowledge signal is received by the receiving means of said mater control unit for being recognized said master control unit then unlocking said door of said car whereby said keyless lock device can eliminate the necessity of pressing a push-bottom switch to open said door.

2. The keyless lock device for a car as claimed in claim 1, wherein said remote controller has a push-button key connected to said encoder whereby a re-acknowledgement signal is transmitted by pressing said push-button key.

3. The keyless lock device for a car as claimed in claim 1, wherein said master control unit further has an alarm unit and an engine start unit connected to said processing unit.

4. The keyless lock device for a car as claimed in claim 1, wherein said processing unit is a PIC16C56 processor IC.

5. The keyless lock device for a car as claimed in claim 3, wherein said alarm unit is a PIC16C56 processor IC.

* * * * *